UNITED STATES PATENT OFFICE.

PAUL LAIDLEY, OF ST. LOUIS, MISSOURI.

SELF-RISING FLOUR AND PROCESS OF MAKING THE SAME.

1,244,867. Specification of Letters Patent. Patented Oct. 30, 1917.

No Drawing. Application filed November 2, 1916. Serial No. 129,083.

*To all whom it may concern:*

Be it known that I, PAUL LAIDLEY, a citizen of the United States, residing at the city of St. Louis and State of Missouri, have invented a new and useful Improvement in Self-Rising Flour and the Processes of Making the Same, of which the following is a specification.

This invention relates to improvements in self-rising flour and the process of making the same.

An object of the invention is to provide a self-rising flour including an alum leavening agent neutralized or reduced in acid strength, thereby preventing the alum from affecting the oils in the cereal flour and preventing the mixed flour from becoming rancid.

Another object of the invention is to provide a prepared self-rising flour containing a leavening agent that will not burn before the bread is baked and cause charred specks to show on the surface of the finished product.

Another object of the invention is to provide a process for the production of prepared flours utilizing alum leavening agents neutralized so as to produce a flour that will not deteriorate by heat and which will produce satisfactory breads and the like.

In carrying out the invention a selected quantity of one of the common alum leavening agents, such as sodium aluminum sulfate, or acid aluminic sulfate, is mixed with a quantity of starch or other carbohydrate, either in a wet or dry state, so as to reduce the acidity of the alum compound. The starch absorbs the alum and reduces the neutralizing strength or acid action thereof, so that when it is mixed with any of the cereal flours it will not have sufficient strength to affect the oil in the flour. The alum leavening agent thus treated is mixed with a suitable quantity of sodium bicarbonate, and the mixture added to a cereal flour, such as wheat, buckwheat or corn flour.

The leavening process, when the prepared flour is baked, results from the action of the alum, an acid, on the sodium bicarbonate, an alkali. When the product composed of the flour is baked, the heat causes the alum and bi-carbonate of soda to combine, forming a sulfate or neutral salt and an aluminum compound, thereby releasing carbonic acid gas in the body of the product, expanding the body of the product in cellular form and thereby permitting it to be thoroughly cooked within, and raising it as required for a satisfactory bread, or other bakery product.

It will be understood that the quantity of starch or other carbo-hydrate used with the alum leavening agent is dependent upon the neutralizing strength of the acid desired for action with the sodium bicarbonate and may be varied correspondingly. As illustrative formulas, the following are submitted:

1. To standardize sodium aluminum sulfate to fifty per cent. neutralizing effect, fifty pounds sodium aluminum sulfate are mixed with fifty pounds starch. This mixture neutralizes the sodium bicarbonate in the ratio of two to one by weight, that is two pounds of the mixture neutralizes one pound of sodium bicarbonate.

2. To standardize acid aluminic sulfate to one hundred per cent., eighty pounds acid aluminum sulfate are mixed with twenty pounds starch. This mixture neutralizes the sodium bicarbonate in the ratio of one to one, by weight, that is one pound of the mixture neutralizes one pound of sodium bicarbonate.

The quantity of the treated alum that is mixed with the flour is dependent upon the leavening effect desired.

It will be understood that variations may be made in the quantities of the different ingredients used and that chemically equivalent ingredients, having the same effect, may be employed without departing from the spirit and scope of the invention.

What I claim and desire to secure by Letters Patent, is:—

1. A self-rising flour containing an alum